3,043,793
PROCESS FOR LOWERING THE BRITTLE POINT OF SOLID HEPTANE-INSOLUBLE POLYPROPYLENE
Thomas S. Mertes, Wilmington, Del., and Thomas J. Kelly, Newtown Square, Pa., assignors to Sun Oil Company, Philadelphia, Pa., a corporation of New Jersey
No Drawing. Filed Jan. 8, 1958, Ser. No. 707,663
1 Claim. (Cl. 260—33.6)

This invention relates to new compositions of matter and their preparation. More particularly, the present invention relates to new compositions consisting essentially of heptane-insoluble polypropylene compounded with heptane-soluble polypropylene and an oil.

Propylene has heretofore been polymerized to relatively low molecular weight liquids or soft amorphous solids through the use of polymerization catalysts such as aluminum trichloride, boron trifluoride and the like. Relatively high molecular weight solid polymers of propylene can be prepared by contacting it with a dispersion of titanium trichloride and an activator such as aluminum triethyl maintained in an inert, liquid reaction medium. Generally such processes produce polymers of propylene having molecular weights of above about 10,000 and usually within the range of from about 50,000 to 500,000. A major proportion of the solid products obtained using the mentioned catalyst is insoluble in n-heptane boiling at atmospheric pressure, and is hereinafter referred to as heptane-insoluble polypropylene. Heptane-soluble polypropylene is also formed in the reaction, and is conveniently separated from the heptane-insoluble polymer by contacting with boiling n-heptane. The heptane-insoluble polymer has a higher average molecular weight than the soluble material. Although the heptane-insoluble polymers of propylene possess many desirable properties, apparently due to the regularity of their molecular structure, they are not suitable for use in many applications because of their high brittle points. By "brittle point" is meant the temperature at which the polymer exhibits brittle failure under specific impact conditions as measured by ASTM test (D746–55T). For example, sheets of polypropylene are not suitable in applications where flexibility is required such as for use as wrapping materials, because of cracking at temperatures encountered at usual room temperatures, or slightly below usual room temperatures. Likewise, fluid containers, fluid conduits, floor coverings, or like articles prepared from polypropylene suffer the disadvantage of having high brittle points.

An object of the present invention is to provide polypropylene compositions having a low brittle point. Another object is to provide polypropylene compositions which may be molded or otherwise fabricated to form resilient, flexible products.

Many of the plasticizers suitable for use in lowering the brittle point of other polymers cannot be used in heptane-insoluble polypropylene because they do not blend homogeneously with the polymer. Others will blend satisfactorily, but do not serve to lower the brittle point appreciably.

It has now been found that heptane-insoluble polypropylene will blend homogeneously with a mixture of heptane-soluble polypropylene and a high boiling oil, and that when blended, an extremely flexible composition is obtained which remains flexible at temperatures as low as −79° C. or lower.

The heptane-insoluble polypropylene used in the process of the invention can be prepared by polymerizing propylene with a solid catalyst maintained as a dispersion in an inert, liquid diluent, such as n-heptane or isooctane. The solid catalyst is preferably a halide of a metal such as zirconium, chromium, vanadium, molybdenum or titanium wherein the metal is in a valence state other than its highest valence state. A lower halide of titanium such as titanium trichloride or titanium dichloride, or a mixture thereof, is preferred. The metal halide is used with an activator therefor such as an aluminum alkyl. For example, aluminum triethyl, aluminum triisopropyl, aluminum tri-n-propyl, or aluminum triisobutyl are suitable activators and give good results. Generally a mole ratio of activator to metal halide of 1:1 to 12:1 is used. Temperatures of from about 0° C. to 170° C. are suitable. Atmospheric pressure can be used although elevated pressures are preferred in that the polymerization reaction proceeds at a faster rate at such elevated pressures, say up to about 10,000 p.s.i.g. (pounds per square inch gauge). Polypropylene is recovered from the reaction system by draining the inert, liquid reaction medium and the catalyst is deactivated and removed by contacting the polypropylene with water, alcohol or an aqueous or alcoholic solution of an inorganic acid, such as nitric acid, with vigorous agitation. Preferably, such agitation provides for comminuting the polymer during the contacting with the catalyst deactivating liquid to insure good catalyst deactivation. The polymer is then repeatedly washed to remove at least a major proportion of the residual inorganic material from the catalyst, and is then dried. The described procedure yields a product which is a mixture of a predominant amount of heptane-insoluble polypropylene with a minor amount of heptane-soluble polypropylene. The soluble polymer can be removed by dissolution in boiling n-heptane. The heptane-insoluble polypropylene will generally have a molecular weight of from about 50,000 to 500,000, and a melting point of from about 161° C. to 171° C.

The heptane-soluble polypropylene is separated from the hydrocarbon solvent by any convenient means, such as by distillation, or may be used in solution in the process of this invention. This soluble polymer is a relatively low molecular weight material ranging from a viscous oil to a solid. Due to its solubility in hydrocarbons, it is relatively easily blended with high boiling oils and forms a homogeneous mixture.

In the process of this invention, any of the normally liquid petroleum fractions having a boiling point above about 200° C. may be used as the high boiling oil to be blended. Oils having a high boiling point are required in order to prevent evaporation of the oil from the polypropylene composition during molding or during subsequent use of products made from the composition.

The weight ratio of the oil to the heptane-soluble polypropylene may be varied from about 1 to 5 to about 2 to 1 and good results obtained. Lower ratios of oil to heptane-soluble polymer do not substantially affect the properties of the polypropylene composition to be prepared, while higher ratios produce a mixture which cannot be homogeneously blended with the heptane-insoluble polypropylene, since the heptane-insoluble polymer is substantially insoluble in the oil. The polypropylene composition of this invention may have from about 50% to about 90% of heptane-insoluble polypropylene. Lower proportions of the oil and heptane-soluble polymer mixture do not substantially affect the properties of the polypropylene composition, while higher proportions result in a composition which is too soft and which has a low strength.

In a preferred embodiment, polypropylene as recovered from the above-described polymerization reaction, i.e., a mixture of heptane-soluble and heptane-insoluble material, is used to form the compositions of this invention, and the proportion of heptane-soluble to heptane-insoluble material is varied as described. For example, a portion of the heptane-soluble material is removed from the polypropylene by contacting with boiling n-pentane if it is desired to reduce the proportion of heptane-soluble material.

The proportion of heptane-soluble material to heptane-insoluble material is also conveniently varied by changes in the polymerization conditions. Higher polymerization temperatures produce a larger proportion of heptane-soluble materials, and some of the catalyst components described as suitable for this process cause the production of higher proportions of the heptane-soluble material than do others.

In the preferred embodiment, therefore, the oil is blended with the heptane-soluble and heptane-insoluble mixture as obtained from the polymerization reaction, or with the proportion of the heptane-soluble material to the heptane-insoluble material adjusted as described.

The oil, heptane-soluble polymer, and heptane-insoluble polymer may be blended by any convenient means. A preferred method is to blend them in solution in a solvent, such a decahydronaphthalene, tetrahydronaphthalene, or the paraffinic hydrocarbons, such as the octanes, decanes, and dodecanes. The solvent used must have a boiling point below that of the oil to be blended. At high temperatures, say above about 130° C., heptane-insoluble polypropylene is soluble in these materials. The solvent may then be separated, as by distillation, evaporation or spray drying leaving a homogeneously blended composition. If desired, the composition may be separated from the solvent by adding a polar solvent having negligible mutual solubility with the oil, such as methanol, to the solution, so that the composition is precipitated and may be filtered.

Other blending means may also be used and good results obtained. For example, the components may be heated to a temperature above the melting point of the heptane-insoluble polypropylene and mechanically blended. Another method that may be used is to take the polymer as removed from the polymerization reactor, which, as previously described herein, is a mixture of heptane-insoluble polypropylene with a minor amount of heptane-soluble polypropylene, and blend this mixture with a suitable amount of oil by one of the methods hereinbefore described.

Although the hereinbefore described method for polymerizing propylene is the preferred method, polypropylene prepared by other methods may equally well be used in the process of this invention.

The following example, in which "parts" refers to parts by weight, illustrates the specific embodiment of this invention:

Heptane-insoluble polypropylene having a melting point of 165° C. and a brittle point of 13° C. was dissolved in decahydronaphthalene, by heating the solvent to 150° C., and adding 50 parts of the polymer. Thirty parts of heptane-soluble polypropylene, a wax-like material, and twenty parts of a petroleum lubricating oil fraction having a boiling range of 370° C. to 540° C. were then dissolved in the solvent and the solution was agitated for an additional ten minutes. The solvent was then partially removed by evaporation under vacuum. The remaining solvent was removed by tray drying the solid product in a vacuum oven. The polypropylene composition remaining was found to be a very flexible, slightly elastic material having a durometer hardness of 40. The material had a brittle point of below −79° C., and retained its physical characteristics after remelting and compression molding. Flat sheets such as are suitable for use as floor coverings, are flexible and resilient. The material does not take a permanent set when bent or indented, but recovers its original shape.

Other polypropylene compositions prepared by the process of this invention, having components within the ranges set out hereinbefore, have a brittle point below about −10° C., and a hardness below about 70 durometer. Suitable dyes may be added to obtain different colors as desired. Preferably these compositions also contain a small amount, generally from .01% to .3% of an anti-oxidant, such as 4,4'-thio-bis-(6-tert-butyl-m-cresol) to prevent degradation of the material. Such anti-oxidants may be added at any convenient stage in the manufacture of the polypropylene composition, such as, for example, when the components of the composition are blended.

The invention claimed is:

A process for lowering the brittle point of solid heptane-insoluble polypropylene which consists essentially in dissolving said polypropylene at a temperature above 130° C. in an inert liquid hydrocarbon solvent containing 8 to 12 carbon atoms per molecule, admixing therewith a petroleum lubricating oil fraction and heptane-soluble polypropylene in a weight ratio of said oil to said heptane-soluble polypropylene of 1:5 to 2:1, the weight proportion of said heptane-insoluble-polypropylene to the mixture of said lubricating oil and said heptane-soluble polypropylene being from 50:50 to 90:10, removing said hydrocarbon solvent therefrom, and recovering a solid polypropylene composition having a brittle point below minus 10° C. consisting essentially of 50 to 90% by weight of said heptane-insoluble polypropylene and 50 to 10% by weight of a mixture consisting essentially of said petroleum lubricating oil fraction and said heptane-soluble polypropylene in a weight ratio of said lubricating oil to said heptane-soluble polypropylene of from 1:5 to 2:1.

References Cited in the file of this patent

UNITED STATES PATENTS

| | | |
|---|---|---|
| 2,691,647 | Field et al. | Oct. 12, 1954 |
| 2,832,759 | Nowlin et al. | Apr. 29, 1958 |
| 2,845,414 | Schutze | July 29, 1958 |
| 2,860,125 | Lanning | Nov. 11, 1958 |
| 2,874,153 | Bowman et al. | Feb. 12, 1959 |
| 2,930,788 | Banks | Mar. 29, 1960 |
| 2,940,949 | Mullin | June 14, 1960 |